Oct. 2, 1962  V. B. HANEY  3,056,229
INTERCHANGEABLE INSERTS FOR FISHING FLOATS
Filed Sept. 29, 1961  2 Sheets-Sheet 1

Virgil B. Haney
INVENTOR.

BY *[signature]*
Attorneys

Oct. 2, 1962 V. B. HANEY 3,056,229
INTERCHANGEABLE INSERTS FOR FISHING FLOATS
Filed Sept. 29, 1961 2 Sheets-Sheet 2

Virgil B. Haney
INVENTOR.

United States Patent Office 3,056,229
Patented Oct. 2, 1962

1

3,056,229
INTERCHANGEABLE INSERTS FOR FISHING
FLOATS
Virgil B. Haney, 473 Palmetto, Corpus Christie, Tex.
Filed Sept. 29, 1961, Ser. No. 141,780
7 Claims. (Cl. 43—44.87)

This invention relates to novel interchangeable top and bottom float attachments which are readily applicable and removable and which, considered in combination, serve to transform a simple cork fishing float into a unique adaptation capable of performing all functions and duties of a highly efficient float.

A general objective is to provide simple, practical and economical attachments or inserts through the medium of which practically all commonly used corks or floats may be rigged to do a better job. To this end the construction and arrangement of the inserts is such that corks with a line bore therethrough or corks with a line bore and a radial line inserting slit or slot may be accommodated regardless of the shape (ball-like, elongated or otherwise) of the cork or float.

The purposes and conveniences of the instant invention are many. For example its adoption and use enhances the operation and performance of a cork or float by adding significant and worthwhile features which, as experience has shown, have been found adaptable and desirable to users. Applying and removing the attachments or inserts can be accomplished with little or no effort, with a saving of valuable time and, with the attachments in place the fisherman may convert or change from a sliding cork operation to one of a permanent depth set or vice versa. Another advantage is derived as a result of the expeditious manner whereby a cork or float may be attached to the line when, for instance, the cork is of the commonly used split-type construction, that is, where the float has a radial slot communicating with the usual axial bore and with the bore and slot extending the full length (or diameter) of the float body.

Persons conversant with the art to which the invention relates are aware that many and varied so-called line locks have been evolved and produced. However, and as is generally the case, the line locking means utilized is permanently installed with a result that the thus-equipped float is tailor made. Contrary to this, the inserts or attachments, one at the top and one at the bottom of the float, are not built into the float but are readily insertable and removable and consequently are in this manner unique and desirable in carrying out the interchangeable aspect of the concept.

Further, the invention, considered as a unitary attachment means, contributes to the overall efficiency of the converted float. The means is effortless to attach, provides a sound-effect or popping head resulting in water turbulence when in use thereby attracting fish, may be made to fit most plain corks or floats, can be easily converted from a sliding cork operation to a permanent depth set and renders the thus-improved float attractive and enhances its effective usefulness.

In carrying out the invention a two-part or composite attachment is connectible with the upper portion of the bore of the float and a unitary or one-piece insert or attachment is plugged into and connectible with the lower portion of the line bore. The last-named attachment, the simpler of the two, is desirable in that it embodies a suitably tapered tubular shank which constitutes a practical line guide, the lower end of the shank being provided with a novelly designed gripping knob exposed and available for applying and removing the insert or line guide.

With respect now to the top attachment or insert this is characterized, briefly stated, by a tubular or hollow tapered stem which is fitted telescopically into the upper portion of the line bore of the float, said stem provided at its upper end with a concavo-convex or an equivalent cup performing as a novel popping head. This stem serves as a bushing for the bore and also a bushing for an insertable and removable shaft. The shaft is novel in that it has means at upper and lower ends to retain it rotatably in the stem but is particularly distinct in that the peripheral surface has a line channeling groove the upper or major portion of which is linearly straight and opens through the upper end of the shaft and the lower end portion of which is laterally and suitably angled, oblique angled for example, to enable the shaft to have the several positions necessary in carrying out the aims of the invention as will be hereinafter more specifically set forth.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a view also in perspective and much like FIGURE 1 except that the ball float is without the radial or side slot, this being a type wherein it is necessary to thread the line through;

Figure 1:
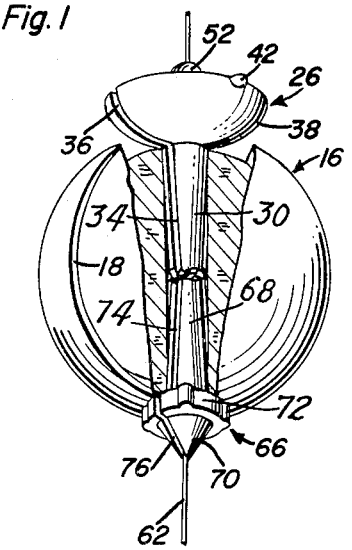
FIGURE 1 is a view in perspective of a so-called split-type float or cork with the improved top and bottom attachments thereon in functioning relationship.
Figure 2:
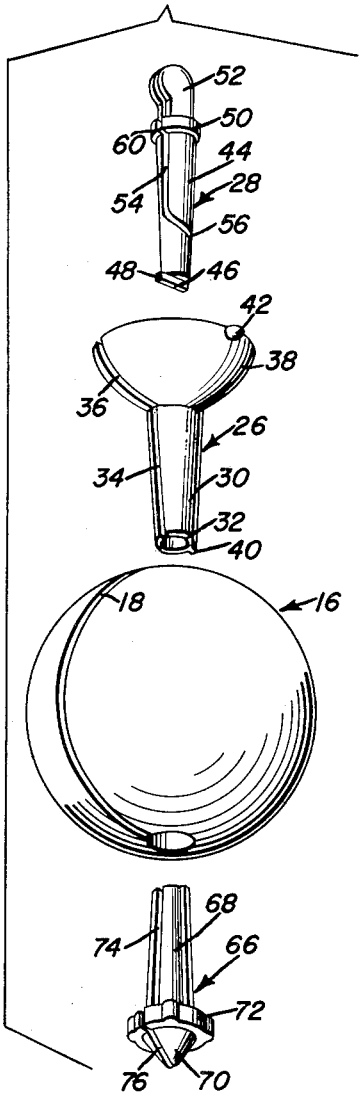
FIGURE 2 is an exploded perspective view showing the float and the several component parts which go to make up the aforementioned top and bottom float-rigging attachments.
Figure 3:
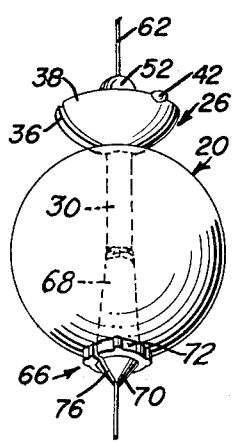
Figure 4:
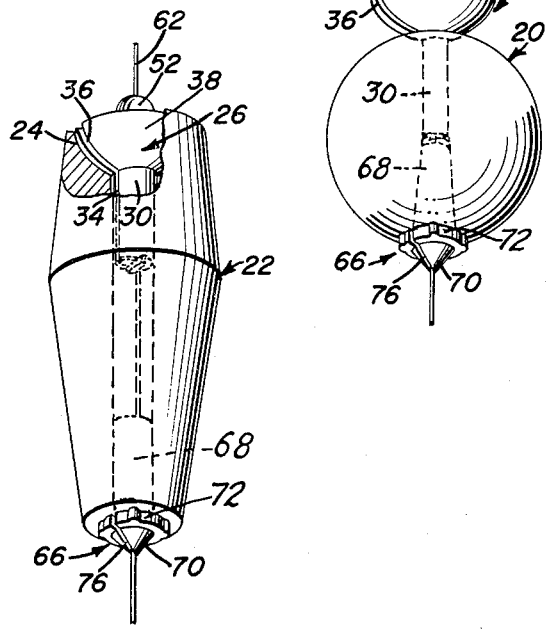
FIGURE 4 is a view in perspective of the portion broken away and shown in section and illustrating an elongated popping float with the invention operatively associated therewith.

By way of introduction to the description of the details it is to be pointed out that FIGURES 1, 3 and 4 are not intended to represent modifications of the invention but are merely to show several different types of floats. These are not the only shapes and types of floats which would properly enter the picture in carrying out the idea of providing readily applicable and removable attachments or inserts for transforming or converting floats to achieve the results herein covered. Therefore, in FIGURE 1 the ball-type cork or float is denoted by the numeral 16 and is a type having a central line bore extending therethrough from top to bottom (not detailed) and provided in one side with a radial slot or slit 18 which communicates with the bore and lets the line into the bore in a now generally well known manner. In FIGURE 3 the ball float 20 is the same as 16 except that the slit in the side is not employed. In this type it is necessary instead of placing the line through the slit into the bore to thread the line through the bore including, of course, the attachment means. The elongated float 22 in FIGURE 4 is a well known type and the upper portion thereof is recessed at 24 to provide a so-called popping float.

With the above in mind it will be seen that the attachments apply to the various floats.

Figure 5:
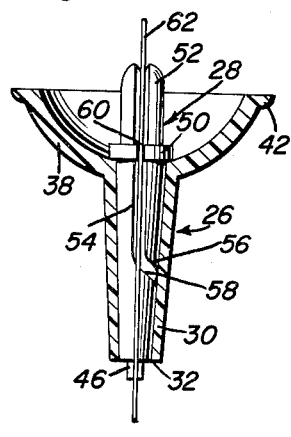
FIGURE 5 is a view in section and elevation showing the top attachment or insert and illustrating the position of the line groove when inserting the line (through the slot in FIG. 1) or, conversely, attaching the float to the line.
Figure 6:
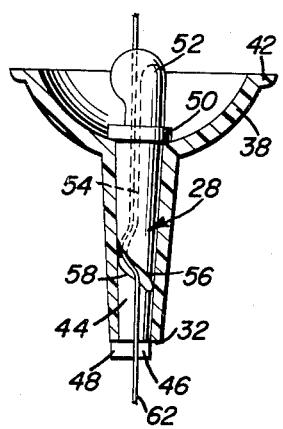
FIGURE 6 is a view similar to FIGURE 5 and showing the shaft turned to the left at right angles, this being the position occupied by the shaft to the line when the line is connected with the float but with the line or float free to slide.
Figure 7:
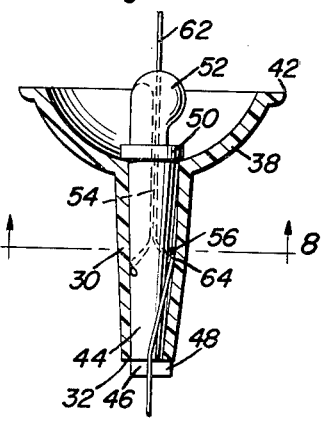
FIGURE 7 is a view interrelated with FIGURES 5 and 6 and showing the shaft turned to the right, thus being the position that the shaft takes when wedging or binding the line and representing the permanent set or locked position of the float.
Figure 8:
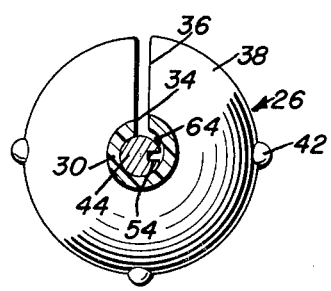
FIGURE 8 is a section on the horizontal line 8—8 of FIGURE 7 locking in the direction of the arrows.
Figures 9, 10:
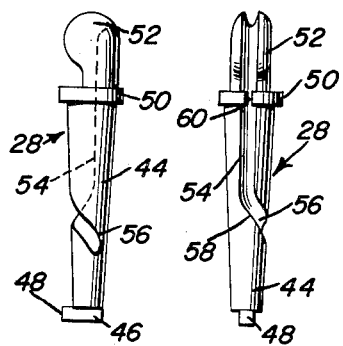
FIGURE 9 is a side elevation of the aforesaid rotatable line controlling shaft.
FIGURE 10 is a view in elevation taken at right angles to FIGURE 9.
Figure 13:
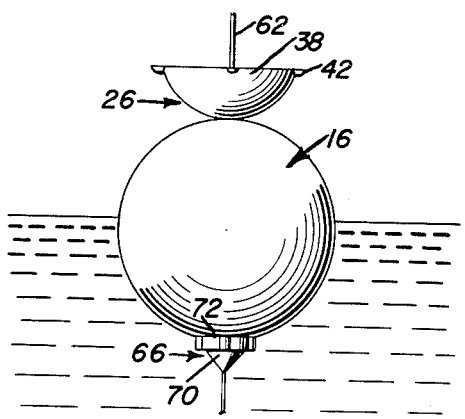
FIGURE 13 is a view in elevation of the float (see either FIGURES 1 or 3) and which is intended to represent the float in the water and to indicate how the popping head may be brought into play by properly jerking and controlling the fishing line.
Figure 11:
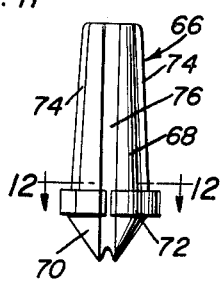
FIGURE 11 is a view in elevation of the bottom attachment or insert.
Figure 12:
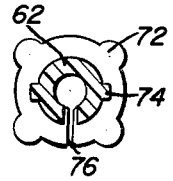
FIGURE 12 is a section on the line 12—12 of FIGURE 11.

The top attachment is of two parts or composite and is characterized by the companion components 26 and 28, respectively. The part 26 is a onepiece construction and comprises an elongated tapered tube or tubular stem 30 the lower end being designated at 32. This stem is provided in one side with a line inlet and exit slit or slot 34 registering with a complemental slot 36 in the same side of the integral bowl or cup 38. This cup is concavo-convex in form and the upper open end of the stem communicates with the opening in the bottom of the cup and the cup constitutes the aforementioned popping head. The stem may be provided with one or more external ribs or equivalent expedients 40 to assist in anchoring the stem in the bore of the cork. Also circumferentially spaced or equivalent embossments or projections 42 may be provided on the upper exterior portion of the cup to assist in anchoring it in place when, for example, it is employed within the popping cavity 24 of the popping float 22 as seen in FIGURE 4. These elements 42 also serve as fingergrips. The companion or complemental part 28 comprises a tapered member conveniently referred to as a shaft 44. This shaft is passed through the stem and therefore the stem provides a mounting and rotating bushing in the manner best brought out in FIGURES 5 to 7, inclusive. The length and taper of the shaft correspond with the tubular stem 30 and the lower end of the shaft is provided with a transverse rib 46 with a projecting end which constitutes a detent or lug 48. When the shaft is shoved through the expansible and contractible sleeve-like stem 30 and when the shaft is properly turned the lug constitutes a key which assists in holding the parts 26 and 28 in assembled relationship. There is also an outstanding collar or ring 50 on the upper portion of the shaft and this resides in rotatable contact with the centrally apertured bottom of the popping cup also as shown in FIGURES 5, 6 and 7. The upper end of the shaft is suitably shaped to provide a convenient fingergrip or head 52 which facilitates grasping and turning the shaft to any one of the several positions illustrated in FIGURES 5, 6 and 7 consecutively. A unique feature of this shaft is that it is provided in its peripheral surface with a substantially straight lengthwise groove 54 constituting a line channel and which extends through the fingergrip and in this way bifurcates the fingergrip so that the furcations provide not only convenient holds but which may be pressed together or spread apart, using a screwdriver, for example, to facilitate cooperation with lines of different gauges. It may be stated in this connection that the component parts 26 and 28 are made of suitable pliable or pliant plastic materials to avoid rigidity and to reduce friction. Returning to the important groove it will be noted that the lower end is directed laterally at an oblique angle where it terminates at 56 in a position above the bottom of the shaft, the angularity being such that the bridging portion (FIG. 10) of the angle groove as at 58 performs the important function illustrated in FIGURES 5, 6 and 7. With this construction when the kerf 60 is in line with the overall groove (54 and 56) and when these features are in turn lined up with the slot 18 in the float the fishing line 62 may be inserted and passed through the slots 34 and 36 and seated in the aligned groove means 54. By turning the shaft approximately one-quarter of a turn to the left as shown in FIG. 6 the groove is disaligned with the slots 18, 34 and 36 and consequently the float is fastened on the line before the line is attached to the float. However, and in this position the line is free to slide so that a slidable float is available. But turning the shaft approximately one-half turn as illustrated in FIG. 7 the edge 58 comes into play and wedges or binds the portion 64 of the line against bushing and the line is locked.

The bottom insert or attachment is denoted at 66 and comprises a plastic shank or tubular plug which is denoted at 68. The hollow portion of the plug provides a line guide. The pointed nose at the bottom 70 is primarily decorative and above this there is a suitably knurled or otherwise constructed gripping knob 72. The numeral 74 designates retaining ribs or equivalent projections to assist in holding the plug removably in place. The line entrance and exit slot which extends lengthwise along the side is denoted at 76.

As stated the invention (top and bottom attachments or inserts 26, 28 and 66) is designed in a manner to render many useful and time-saving features to its users. For instance, a regular or simple float may, within seconds, be converted into one of greater desirability and convenient use. Also, its features offer considerable improve, plus speedier operational action to many of the lesser common type corks and floats presently being marketed. Actually, its popping feature will be found superior to that of most so-called popping corks. It is shaped to fit into the concave of the presently marketed popping corks, and of course contributes all of its other uses and conveniences to this type cork.

The invention, when adapted to a regular, popping or split cork, automatically converts it into a float that has or does everything a float should. It converts the regular cork into a super popper. Makes it into a slip cork and also a stage setter. When adapted to a popping cork, it serves to improve its all around performance, plus adding to it, the slip and stage set features. As for the adaption to a split cork, in addition to the above features, it provides for the float to be engaged and disengaged from the line intantaneously without the necessity of having to cut line and then subsequently having to re-rig.

The change from slip position to one of locked stage set or vice versa position may be made in a matter of seconds. This operation is one of merely turning the control shaft 28 to either the right or left. Also the changing of the locked stage set position from one depth to another is one of great convenience requiring only limited seconds. The latter is a much desired and appreciated feature when fishing varied depths and especially so in the case of the boat fisherman who usually shifts from various water depths before fish are located.

The popping cork effect is attained from the cup bowl 38. Its operation is effected through a light jerk or pulling action on the rod or pole. This jerk or pull action causes the float to submerge. Its submerging is partially due to the weight of sinker or bait or the drag action on either or both. This submerging of a float, equipped with an all purpose insert creates a gurgle or popping sound, plus a water boiling condition, which in conjunction simulates fish striking or feeding. The theory in this function is to attract fish to the feeding area, whereupon the baited hook is the offering.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a cork float having a line accommodating bore extending therethrough and open at its top and bottom ends, a tapered tubular stem removably fitted in and bushing the upper portion of said bore, a readily applicable and removable top insert fitted into the stem, the latter providing a bushing therefor and said insert being assembled and held but capable of being hand-turned and having an accessible upper end for ready turning needs, said insert constituting a shaft and being provided in a lengthwise surface with a line threading and seating groove, said groove having its upper end opening through the upper end of the shaft and its lower end terminating at a median portion of the shaft.

2. The structure according to claim 1, and wherein said groove is linearly straight throughout its major portion, the lower end portion only being oblique angled, gradually diminishing in depth, and terminating at a point well above the lower end of the shaft, said oblique-angled portion constituting a line release when in one given position and a line wedging lock when in another or second given position.

3. The structure according to claim 2, and in combination, a bottom insert comprising a tubular plug telescopically removably plugged into the lower portion of said bore, having an accessible gripping knob and also a line slot, said insert providing a bushing for the bore and functioning as a line guide.

4. The structure defined in claim 3, and wherein the upper end of the stem of the first-named insert is provided with a concavo-convex cup constituting a popping head.

5. Attachment means for rigging a bored cork float to provide same with added facilities comprising an interchangeable removably applicable top insert embodying a hollow tapered stem with a lengthwise line slot in one side and an integral centrally apertured popping cup on the upper end of the stem with a line slot registering with the first-named slot, a shaft tapered to conform with and mounted for rotation in the hollow tapered portion of said stem and having a line passing and locking lengthwise groove in its peripheral surface cooperating with the interior surface of the stem, the upper portion of the shaft having a limit collar in rotatable contact with the centrally apertured bottom of the cup, said collar having a kerf in line with the associated groove, and the lower end of the shaft having an assembling and retaining lug rotatably contacting the lower end of the stem.

6. The structure defined in claim 5, and wherein said groove is straight from its upper end down to a median portion of the shaft where it then has an oblique angled end portion terminating well above the lower end of the shaft.

7. The structure according to claim 6, and in combination, a bottom insert comprising a tapered tubular shank having a knob on its bottom and a side positioned line inserting and removing lengthwise slot, said insert providing a bushing for the float's bore and also constituting a line guide.

References Cited in the file of this patent

UNITED STATES PATENTS

| | | |
|---|---|---|
| 1,850,748 | Foster | Mar. 22, 1932 |
| 2,591,332 | Behensky | Apr. 1, 1952 |
| 2,724,206 | Miller | Nov. 22, 1955 |
| 2,729,015 | Finnegan | Jan. 3, 1956 |
| 2,825,175 | Skvier | Mar. 4, 1958 |